United States Patent
Hosoda et al.

(10) Patent No.: US 12,521,705 B2
(45) Date of Patent: Jan. 13, 2026

(54) HONEYCOMB STRUCTURE AND EXHAUST GAS PURIFYING DEVICE

(71) Applicant: NGK Insulators, Ltd., Nagoya (JP)

(72) Inventors: Kazuya Hosoda, Toyoake (JP); Takafumi Kimata, Nagoya (JP); Yunie Izumi, Nisshin (JP); Takuya Nakashima, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 665 days.

(21) Appl. No.: 17/934,630

(22) Filed: Sep. 23, 2022

(65) Prior Publication Data

US 2023/0016907 A1   Jan. 19, 2023

Related U.S. Application Data

(63) Continuation of application No. PCT/JP2021/017292, filed on Apr. 30, 2021.

(30) Foreign Application Priority Data

May 14, 2020   (JP) .................... 2020-085408

(51) Int. Cl.
*B01J 35/33*   (2024.01)
*B01D 39/20*   (2006.01)
(Continued)

(52) U.S. Cl.
CPC .......... *B01J 35/33* (2024.01); *B01D 39/2003* (2013.01); *B01D 39/2027* (2013.01); *B01D 39/2068* (2013.01); *B01D 46/2429* (2013.01); *B01D 46/24491* (2021.08); *B01D 53/94* (2013.01); *B01J 23/06* (2013.01); *B01J 23/75* (2013.01); *B01J 35/57* (2024.01); *B01D 2255/9155* (2013.01); *B01D 2279/30* (2013.01);
(Continued)

(58) Field of Classification Search
None
See application file for complete search history.

(56) References Cited

U.S. PATENT DOCUMENTS

2017/0014763 A1   1/2017   Crawford et al.
2017/0022868 A1   1/2017   Crawford et al.
(Continued)

FOREIGN PATENT DOCUMENTS

JP   H11-336534 A   12/1999
JP   2011134995 A * 7/2011
(Continued)

OTHER PUBLICATIONS

Kurosawa et al. WO2016021186A1—translated document (Year: 2016).*

(Continued)

*Primary Examiner* — Jelitza M Perez
(74) *Attorney, Agent, or Firm* — BURR PATENT LAW, PLLC

(57) ABSTRACT

A pillar shaped honeycomb structure includes: an outer peripheral wall; and porous partition walls disposed on an inner side of the outer peripheral wall, the partition walls defining a plurality of cells, each of the cells penetrating from one end face to other end face to form a flow path, wherein at least one cell of the cells has a magnetic substance coated with glass.

15 Claims, 6 Drawing Sheets

The enlarged view of the region is shown in FIG. 3.

(51) Int. Cl.
- *B01D 46/24* (2006.01)
- *B01D 53/94* (2006.01)
- *B01J 23/06* (2006.01)
- *B01J 23/75* (2006.01)
- *B01J 35/57* (2024.01)
- *F01N 3/20* (2006.01)
- *F01N 3/28* (2006.01)

(52) U.S. Cl.
CPC .......... *F01N 3/2013* (2013.01); *F01N 3/2828* (2013.01); *F01N 2370/02* (2013.01)

(56) References Cited

U.S. PATENT DOCUMENTS

| | | |
|---|---|---|
| 2019/0323401 A1 | 10/2019 | Miyairi et al. |
| 2020/0265979 A1 | 8/2020 | Hug et al. |
| 2021/0115825 A1 | 4/2021 | Miyairi et al. |

FOREIGN PATENT DOCUMENTS

| | | | | |
|---|---|---|---|---|
| JP | 2016-187766 A | 11/2016 | | |
| JP | 2019-188272 A | 10/2019 | | |
| JP | 2020072001 A * | 5/2020 | | |
| WO | WO-2016021186 A1 * | 2/2016 | ............. | B01J 35/02 |
| WO | 2019/086517 A1 | 5/2019 | | |
| WO | WO-2020031434 A1 * | 2/2020 | ............. | B01D 46/42 |

OTHER PUBLICATIONS

Mori et al. JP2011134995A—translated document (Year: 2011).*
Fukumori et al. JP2020072001A—translated document (Year: 2020).*
English translation of the International Preliminary Report on Patentability (Chapter I) dated Nov. 24, 2022 (Application No. PCT/JP2021/017292).
International Search Report and Written Opinion (Application No. PCT/JP2021/017292) dated Jun. 29, 2021 (with English translation).

* cited by examiner

The enlarged view of the region is shown in FIG. 3.

HONEYCOMB STRUCTURE AND EXHAUST GAS PURIFYING DEVICE

FIELD OF THE INVENTION

The present invention relates to a honeycomb structure and an exhaust gas purifying device. More particularly, it relates to a honeycomb structure and an exhaust gas purifying device, which has improved oxidation resistance.

BACKGROUND OF THE INVENTION

Exhaust gases from motor vehicles typically contain harmful components such as carbon monoxide, hydrocarbons and nitrogen oxides and/or fine particles of carbon or the like as a result of incomplete combustion. From the viewpoint of reducing health hazards to a human body, there is an increasing need for reducing harmful gas components and fine particles in exhaust gases from motor vehicles.

However, at present, these harmful components are discharged during a period immediately after an engine is started, i.e., a period during which a catalyst temperature is lower and a catalytic activity is insufficient. Therefore, the harmful components in the exhaust gas may be discharged without being purified by the catalyst before reaching a catalyst activating temperature. In order to satisfy such a need, it is necessary to reduce emission as much as possible, which is discharged without being purified by a catalyst before reaching the catalyst activating temperature. For example, measures using an electric heating technique are known in the art.

As such an art, Patent Literature 1 proposes a technique for inserting a magnetic wire into a part of cells of a cordierite honeycomb widely used as a catalyst supported honeycomb. According to this technique, a current can be passed through the coil on an outer circumference of the honeycomb to increase a wire temperature by electromagnetic induction heating, and its heat can increase a temperature of the honeycomb.

Exhaust carbon fine particles from diesel engines and gasoline engines affect on human health, so that there is also an increased need for reduction of those fine particles. Such exhaust gas processing employs wall-flow type filters of honeycomb structures which are alternately provided with plugged portions. The carbon fine particles (soot) collected by the filters are burned out and removed by increasing a temperature of the exhaust gas. However, a longer period of time required for the burning and removal causes a problem that consumption of a fuel required for increasing the temperature of the exhaust gas increases. Further, it is preferable to mount the filter at an underfloor position having a relatively large space from the viewpoint of ensuring a mounting space, in terms of ensuring a degree of freedom in a design for forming an exhaust system. However, if it is placed at the underfloor position of a vehicle, a temperature of an exhaust gas from an engine is decreased, which causes a problem that the carbon fine particles cannot be burn out and removed.

To address this problem, Patent Literature 2 discloses a technique for inserting a magnetic wire into plugged portions of a filter.

CITATION LIST

Patent Literatures

[Patent Literature 1] U.S. Patent Application Publication No. 2017/0022868 A1

[Patent Literature 2] U.S. Patent Application Publication No. 2017/0014763 A1

SUMMARY OF THE INVENTION

It is known to dispersedly arrange magnetic particles on a surface of a partition walls of cells instead of providing the metal wire in the cells, and heat them by electromagnetic induction heating. According to such an arrangement, a space is created between the magnetic particles, so that it is possible to ensure permeability and suppress a pressure loss. However, the use of the magnetic particles causes a problem that the surface areas of the magnetic materials are larger, so that they may easily be oxidized and heating performance may be deteriorated.

Further, when both ends of some cells are sealed by plugging and the interiors of the cells are filled with a magnetic metal and the electromagnetic induction heating is carried out, there is a problem that the magnetic metal expands due to heating and plugs of the cells are destroyed. In this case, it is preferable to use the particulate magnetic substance as described above in terms of thermal impact resistance. However, as described above, the use of the particulate magnetic substance causes a problem that the surface area of the magnetic substance is larger, so that they may easily be oxidized and the heating performance may be deteriorated.

In view of the above circumstances, an object of the present invention is to provide a honeycomb structure and an exhaust gas purifying device, which has improved oxidation resistance.

As a result of intensive studies, the present inventors have found that the above problems can be solved by configuring a honeycomb structure such that, in cells of the honeycomb structure, a magnetic substance coated with glass is provided. That is, the present invention is specified as follows:

(1) A pillar shaped honeycomb structure, comprising:
an outer peripheral wall; and
porous partition walls disposed on an inner side of the outer peripheral wall, the partition walls defining a plurality of cells, each of the cells penetrating from one end face to other end face to form a flow path,
wherein at least one cell of the cells has a magnetic substance coated with glass.

(2) An exhaust gas purifying device, comprising:
the honeycomb structure according to (1);
a coil wiring that spirally surrounds an outer circumference of the honeycomb structure; and
a metal pipe for housing the honeycomb structure and the coil wiring.

According to the present invention, it is possible to provide a honeycomb structure and an exhaust gas purifying device, which has improved oxidation resistance.

DETAILED DESCRIPTION OF THE INVENTION

Figure 1:
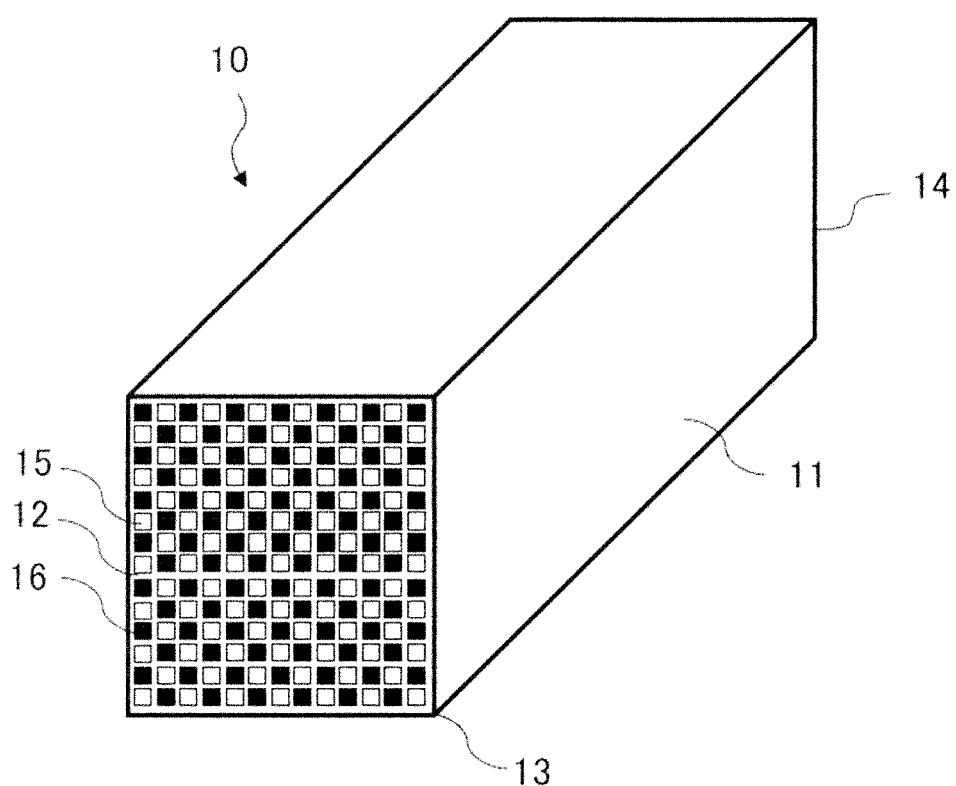
FIG. 1 is a perspective view schematically showing a honeycomb structure according to Embodiment 1 of the present invention.

Hereinafter, embodiments of a honeycomb structure according to the present invention will be described with reference to the drawing. However, the present invention is not limited to these embodiments, and various changes, modifications, and improvements may be made based on knowledge of one of ordinary skill in the art, without departing from the scope of the present invention.

<1. Honeycomb Structure>

Embodiment 1

Figure 2:
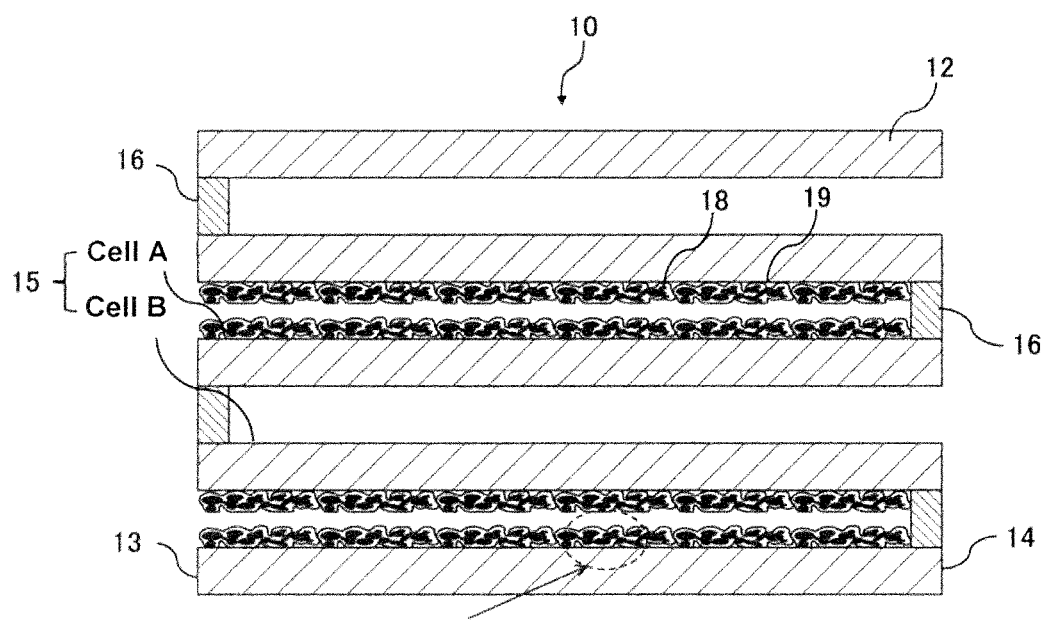
FIG. 2 is a cross-sectional view schematically showing a cross section of a honeycomb structure according to Embodiment 1 of the present invention, which is parallel to an extending direction of cells.

FIG. 1 is a perspective view schematically showing a honeycomb structure according to Embodiment 1 of the present invention. FIG. 2 is a cross-sectional view schematically showing a cross section of the honeycomb structure 10 according to Embodiment 1 of the present invention, which is parallel to an extending direction of cells 15. The honeycomb structure 10 is structured in a pillar shape, and include an outer peripheral wall 11 and porous partition walls 12 which are arranged on an inner side of the outer peripheral wall 11 and define a plurality of cells 15 that penetrate from one end face 13 to the other end face 14 to form flow paths.

In at least one cell of the plurality of cells 15, a magnetic substance 18 coated with glass 19 is provided. The position of the cell 15 to be provided with the magnetic substance 18 coated with the glass 19 is not particularly For example, in a cross section perpendicular to the extending direction of the cells 15, the cell 15 which is provided with the magnetic substance 18 coated with the glass 19 and the cell 15 which is not provided with the magnetic substance 18 coated with the glass 19 may be alternately arranged in a vertical direction and a horizontal direction. Thus, the alternately arranging of the cell 15 which is provided with the magnetic substance 18 coated with the glass 19 and the cell 15 which is not provided with the magnetic substance 18 coated with the glass 19 can result in better electromagnetic induction heating efficiency. The arrangement position and the number of arrangements of the cells 15 which are provided with the magnetic substance 18 coated with the glass 19 can be appropriately designed in view of the heating efficiency and the pressure loss of the honeycomb structure 10.

As used herein, the "glass" includes amorphous glass as well as crystallized glass. The chemical composition of the glass is appropriately selected, including, for example, $SiO_2$-based, $SiO_2$—$Al_2O_3$—MgO-based, $SiO_2$—$Al_2O_3$—MgO—BaO-based, $SiO_2$—MgO—$Al_2O_3$—ZnO-based, $SiO_2$—$B_2O_3$—$Bi_2O_3$-based, $B_2O_3$—$Bi_2O_3$-based, $B_2O_3$—ZnO—$Bi_2O_3$-based, $B_2O_3$—ZnO-based, $V_2O_5$—$P_2O_5$-based, SnO—$P_2O_5$-based, SnO—ZnO—$P_2O_5$-based, ZnO—$La_2O_3$—$B_2O_3$—MgO—BaO—$SiO_2$—$Al_2O_3$-based, $SiO_2$—CaO—ZnO—$Al_2O_3$—MgO-based, BaO—$SiO_2$—MgO—$Al_2O_3$—$Y_2O_3$—$B_2O_3$-based, BaO—$B_2O_3$—$SiO_2$-based, and BaO—$B_2O_3$—MgO—ZnO—$SiO_2$—$Al_2O_3$-based glass. Among them, $SiO_2$—$Al_2O_3$—MgO-based, $SiO_2$—$Al_2O_3$—MgO—BaO-based, $SiO_2$—MgO—$Al_2O_3$—ZnO-based, ZnO—$La_2O_3$—$B_2O_3$—MgO—BaO—$SiO_2$—$Al_2O_3$-based, $SiO_2$—CaO—ZnO—$Al_2O_3$—MgO-based, BaO—$SiO_2$—MgO—$Al_2O_3$—$Y_2O_3$—$B_2O_3$-based, BaO—$B_2O_3$—$SiO_2$-based, and BaO—$B_2O_3$—MgO—ZnO—$SiO_2$—$Al_2O_3$-based glass may be more preferable in terms of oxidation resistance.

Further, in the present invention, for the material of the "glass" and the metal of the "magnetic substance", for example, any combination as follows is preferable from the viewpoint that the glass can uniformly cover the magnetic substance with no defect. Further, the following combinations are preferable in terms of durability during actual use:

the material of glass: $SiO_2$—$Al_2O_3$—MgO-based glass; the metal of the magnetic substance: balance Fe-10% by mass of Si-5% by mass of Al, balance Fe-18% by mass of Cr, or balance Fe-13% by mass of Cr-2% by mass of Si.

the material of the glass: $SiO_2$—$Al_2O_3$—MgO—BaO-based glass; the metal: 49% by mass of Co-49% by mass of Fe-2% by mass of V, balance Fe-17% by mass of Co, or balance Fe-18% by mass of Cr.

the material of the glass: $SiO_2$—MgO—$Al_2O_3$—ZnO-based, ZnO—$La_2O_3$—$B_2O_3$—MgO—BaO—$SiO_2$—$Al_2O_3$-based, $SiO_2$—CaO—ZnO—$Al_2O_3$—MgO-based, BaO—$SiO_2$—MgO—$Al_2O_3$—$Y_2O_3$—$B_2O_3$-based, BaO—$B_2O_3$—$SiO_2$-based, or BaO—$B_2O_3$—MgO—ZnO—$SiO_2$—$Al_2O_3$-based glass, and the metal: balance Fe-17% by mass of Co.

Alkali metals such as lithium, sodium and potassium are generally contained as simple substances or in the form of oxides in glass. The alkali metal contained in the glass is extracted from the glass in a certain temperature range when firing it in the production step or when used in the honeycomb structure, so that it may react with cordierite making up the composition of the honeycomb structure. Therefore, in an embodiment of the present invention, it is preferable that the "glass" is substantially free of those alkali metals. Here, for example, the glass may contain a trace amount of unavoidable impurities due to reasons such as being originally contained in the raw material or being contaminated in the production step. In an embodiment of the present invention, the expression "substantially" free of alkali metals means that those alkali metals are not contained in an amount that exceeds such a trace amount of unavoidable impurities. From such a viewpoint, in the present invention, the content of the alkali metal in the "glass" is preferably 500 ppm by mass or less, and more preferably 200 ppm by mass or less.

In the present invention, the "glass" preferably has a thermal expansion coefficient of $6.5 \times 10^{-6}$/° C. to $15 \times 10^{-6}$/° C. When the thermal expansion coefficient of the glass is $6.5 \times 10^{-6}$/° C. or more, or the thermal expansion coefficient of the glass is $15 \times 10^{-6}$/° C. or less, thermal impact resistance due to the difference in thermal expansion between the glass and magnetic substance can be improved. Further, when the thermal expansion coefficient of the glass is $6.5 \times 10^{-6}$/° C. to $15 \times 10^{-6}$/° C., the operation for coating the metal with the glass is facilitated.

In the present invention, the "glass" preferably has a softening point of 600 to 1200° C. The softening point of the glass of 600° C. or more can allow the oxidation resistance of the honeycomb structure 10 in the operating temperature range to be sufficiently maintained, and the softening temperature of 1200° C. or less can allow baking of the glass and magnetic substance to be carried out in a temperature range that does not exceed the heat resistant temperature of the honeycomb structure 10. The softening point of the glass is more preferably 700 to 1000° C.

As used herein, the "magnetic substance coated with glass" is preferably a magnetic substance in which the entire surface of the magnetic substance is coated with the glass without exposing the surface of the magnetic substance. Further, it may be a magnetic substance in which a part of the surface of the magnetic substance is exposed. In this case, a percentage of the exposed surface of the magnetic substance can be appropriately designed to an acceptable degree in terms of oxidation resistance.

Further, the "magnetic substance coated with glass" may have a structure in which the interface between the glass and the magnetic substance is partially peeled and has open pores including the peeled portion. Further, the "magnetic substance coated with glass" may have a structure in which the glass coating the magnetic substance may have pores. Further, the "magnetic substance coated with glass" may have a constant or non-uniform thickness of the glass coating. When the thickness of the glass coating is non-uniform, it is preferable that the thickness difference between the thickest portion and the thinnest portion of the glass is 20 μm or less. Further, the "magnetic substance coated with glass" may have a structure including a layer in which the glass and the metal of the magnetic substance partially react with each other.

In the honeycomb structure 10, the magnetic substance 18 provided in the cells 15 is thus coated with the glass 19, so that the oxidation resistance is improved. Further, according to such a structure, even if the magnetic substance 18 is composed of fine particles and is very easily oxidized by itself, the coating with the glass 19 can improve the oxidation resistance.

The honeycomb structure 10 has a filter structure. That is, in the honeycomb structure 10, the cells 15 include a plurality of cells A which are opened on one end face 13 and have plugged portions 16 on the other end face 14, and a plurality of cells B which are opened on the other end face 14 side and have the plugged portions 16 on one end face 13, the cells B being arranged alternately with the cells A. The number, arrangement, shape, and the like of the cells A and B are not limited, and they can be appropriately designed as needed. Such a honeycomb structure 10 can be used as a filter for purifying particulate matters (carbon fine particles) in an exhaust gas (for example, a gasoline particulate filter (hereinafter, also referred to as "GPF"), or a diesel particulate filter (hereinafter, also referred to as "DPF")). The plugged portions 16 may employ those having the same structure as that of plugged portions of a conventionally known honeycomb structure.

In the honeycomb structure 10, the magnetic substance 18 coated with the glass 19 is provided in the form of layer on the surfaces of the partition walls 12 in the cells 15 to form coating layers. The coating layer made of the magnetic substance 18 coated with the glass 19 preferably has an open porosity of 40 to 90%. When the open porosity of the coating layer made of the magnetic substance 18 coated with the glass 19 is 40% or more, the exhaust gas entering the cells 15 of the honeycomb structure easily passes through the coating layers, so that deterioration of the function of the honeycomb structure 10 as a filter can be suppressed. Further, when the open porosity of the coating layer made of the magnetic substance 18 coated with the glass 19 is 90% or less, an amount of the magnetic substance required for heating can be ensured. The open porosity of the coating layer made of the magnetic substance 18 coated with the glass 19 is more preferably 40 to 60%, and even more preferably 45 to 55%.

As used herein, "in the form of layer", when the "magnetic substance coated with the glass is provided in the form of layer on the surfaces of the partition walls in the cells" preferably refers to a state where no defect is present in the structure of the layer. However, it may also include a state where a defect(s) such as partially formed layers is/are present.

Figure 3:
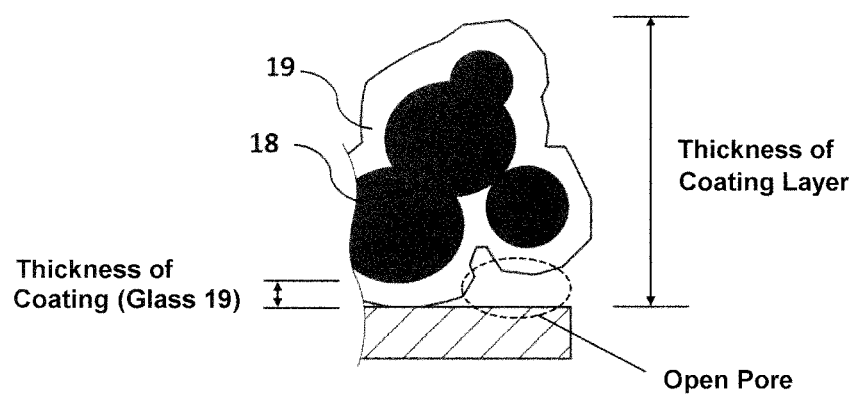
FIG. 3 is an enlarged view of the predetermined region in FIG. 2.

Here, the "open porosity of the coating layer" will be described. First, an enlarged view of the region surrounded by the dotted line frame in FIG. 2 is shown in FIG. 3. As shown in FIG. 3, attention is paid to the open pores existing in the coating layer, which are not in a closed state but connected to the outside of the coating layer, and the pores in the opened state are referred to as the "open pores". Then, a ratio (%) of volumes of the open pores to the volume of the coating layer is defined as the "open porosity of the coating layer". The open porosity of the coating layer can be calculated from an area ratio of the void portions in the opened state and the solid portion by performing SEM imaging and image-analyzing the coating layer portion. The open porosity may also be calculated by the Archimedes method.

The coating layer preferably has a thickness of 30 to 100 μm. The thickness of the coating layer of 0 30 μm or more can provide a better heating efficiency of the honeycomb structure 10 by electromagnetic induction. The thickness of the coating layer of 100 μm or less can suppress a decrease in the pressure loss of the cells 15 of the honeycomb structure 10. The thickness of the coating layer is more preferably 35 to 80 μm, and even more preferably 40 to 60 μm. Further, an amount of the pressure loss increased for the cells 15 provided with the coating layer is preferably 25% or less, and more preferably 20% or less, as compared with the cells 15 that are not provided with the coating layer.

The magnetic substance 18 is magnetized by a magnetic field, and a state of magnetization varies depending on the intensity of the magnetic field. This is represented by a "magnetization curve". The magnetization curve may have a magnetic field H on a horizontal axis and a magnetic flux density B on a vertical axis (B—H curve). A state where no magnetic field is applied to the magnetic material refers to a degaussing state, which is represented by an origin O. As a magnetic field is applied, a curve in which the magnetic flux density increases from the origin O to a saturated state is drawn. This curve is an "initial magnetization curve". A slope of a straight line connecting a point on the initial magnetization curve to the origin is a "magnetic permeability". The magnetic permeability indicates an ease of magnetization of the magnetic substance in such a sense that the magnetic field permeates. The magnetic permeability near the origin where the magnetic field is smaller is an "initial magnetic permeability", and a magnetic permeability that is maximum on the initial magnetization curve is a "maximum magnetic permeability".

The magnetic substance 18 preferably has a maximum magnetic permeability of 10,000 or more. According to such a configuration, when the honeycomb structure 10 having the magnetic substance 18 is subjected to the electromagnetic induction heating, the temperature can be raised in a short period of time until a temperature at which water vaporizes (about 100° C.), and further until a temperature at which the catalyst is activated (about 300° C.). The magnetic substance 18 may more preferably have a maximum magnetic permeability of 25,000 or more, and even more preferably a maximum magnetic permeability of 50,000 or more. Examples of the magnetic substance having a maximum magnetic permeability of 10,000 or more include the balance Fe-10% by mass of Si-5% by mass of Al, 49% by mass of Co-49% by mass of Fe-2% by mass of V, and the balance Fe-36% by mass of Ni, the balance Fe-45% by mass of Ni, and the like.

The magnetic substance 18 preferably has a Curie temperature of 600° C. or more. The Curie temperature of the magnetic substance 18 of 600° C. or more can enable a honeycomb temperature sufficient to increase the catalyst temperature to the catalyst activation temperature or more to be reached, as well as this can lead to ease to burn out and remove PMs (particulate matters) collected in the cells 15 to regenerate a honeycomb structure filter. The magnetic substances having a curry temperature of 600° C. or more include, for example, the balance Co-20% by mass of Fe; the balance Co-25% by mass of Ni-4% by mass of Fe; the balance Fe-15-35% by mass of Co; the balance Fe-17% by mass of Co-2% by mass of Cr-1% by mass of Mo; the balance Fe-49% by mass of Co-2% by mass of V; the balance Fe-17% by mass of Co-10% by mass of Cr-2% by mass of Mo-1% by mass of Al; the balance Fe-27% by mass of Co-1% by mass of Nb; the balance Fe-20% by mass of Co-1% by mass of Cr-2% by mass of V; the balance Fe-35% by mass of Co-1% by mass of Cr; pure cobalt; pure iron; electromagnetic soft iron; the balance Fe-0.1 to 0.5% by mass of Mn; the balance Fe-3% by mass Si; and the like. Here, the Curie temperature of the magnetic substance refers to a temperature at which a ferromagnetic property is lost.

The magnetic substance 18 preferably has an intrinsic resistance value of 10 μΩcm to 100 μΩcm at 25° C. The magnetic substance 18 having the intrinsic resistance value of 10 μΩcm or more at 25° C. can lead to an increased amount of heat generated by electromagnetic induction heating because of the higher resistance value. Also, the magnetic substance 18 having the intrinsic resistance value of 100 μΩcm or less at 25° C. can lead to an increased number of portions where electric current flows due to the electromagnetic induction, so that an amount of heat generated by electromagnetic induction heating can further be increased. Examples of the magnetic substances having an intrinsic resistance value of 10 μΩcm or more at 25° C. include the balance Fe-18% by mass of Cr; the balance Fe-13% by mass of Cr-2% by mass of Si; the balance Fe-20% by mass of Cr-2% by mass of Si-2% by mass of Mo; the balance Fe-10% by mass of Si-5% by mass of Al; the balance Co-20% by mass Fe; the balance Fe-15 to 35% by mass Co; the balance Fe-49% by mass Co-2% by mass V; the balance Fe-17% by mass of Co-10% by mass of Cr-2% by mass of Mo-1% by mass of Al; the balance Fe-36% by mass of Ni; the balance Fe-45 by mass of Ni; and the like.

The magnetic substance 18 preferably has a coercive force of 100 Nm or more. According to such a configuration, when the honeycomb structure 10 having the magnetic substance 18 is subjected to the electromagnetic induction heating, the temperature can be raised in a short period of time until a temperature at which water vaporizes (about 100° C.), and further until a temperature at which the catalyst is activated (about 300° C.). The magnetic substances having a coercive force of 100 A/m or more include the balance Fe-35% by mass of Co; the balance Fe-20% by mass of Co-1% by mass of V; the balance Fe-13% by mass of Cr-2% by mass of Si; the balance Fe-18% by mass of Cr; and the like.

The magnetic substance 18 is more preferably made of a material that is not deposited by reacting with the glass. If the magnetic substance 18 reacts with the glass to be deposited, the heating efficiency due to electromagnetic induction may be decreased.

A ratio of a thermal expansion coefficient α1 of the magnetic substance 18 to a thermal expansion coefficient α2 of the glass 19 (α1/α2) is preferably 0.8 to 1.2. When the ratio α1/α2 is 0.8 to 1.2, the expansion coefficient of the magnetic substance 18 will be a value close to the expansion coefficient of the glass 19, and when the honeycomb structure 10 is heated, it can satisfactorily prevent the glass 19 from being separated from the magnetic substance 18 due to expansion. The ratio α1/α2 is more preferably 0.9 to 1.1.

The thermal expansion coefficient al of the magnetic substance 18 is not particularly limited, but it preferably has, for example, a thermal expansion coefficient of $8 \times 10^{-6}$ to $12 \times 10^{-6}/°$ C. When the honeycomb structure 10 is subjected to the electromagnetic induction heating, the thermal expansion coefficient of the magnetic substance 18 of more than $12 \times 10^{-6}/°$ C. may peel off the glass 19. Further, there is substantially no magnetic material having a thermal expansion coefficient less than $8 \times 10^{-6}/°$ C. and a curie temperature of more than 600° C. The thermal expansion coefficient as used herein refers to a thermal expansion coefficient at 900° C. when 25° C. is used as a reference temperature. Examples of the magnetic substance having a thermal expansion coefficient of $8 \times 10^{-6}/°$ C. to $12 \times 10^{-6}/°$ C. include a FeCo alloy containing 10% by mass or more of Co, or stainless steel, and the like. Examples of the FeCo alloy containing 10% by mass or more of Co include permendur, the balance Fe-17% by mass of Co, the balance Fe-49% by mass Co-2% by mass V, the balance Fe-17% by mass Co-2% by mass Cr-1% by mass Mo, and the like. Further, the stainless steel includes ferrite-based stainless steels such as SUS 430f.

The thickness of the glass 19 coating the magnetic substance 18 is preferably 1 to 40 μm. The thickness of the glass 19 coating the magnetic substance 18 of 1 μm or more can lead to further improvement of the oxidation resistance of the magnetic substance 18. The thickness of the glass 19 coating the magnetic substance 18 of 40 μm or less can satisfactorily suppress the pressure loss of the cells 15. The thickness of the glass 19 coating the magnetic substance 18 is preferably 1 to 10 μm, and more preferably 3 to 8 μm, and even more preferably 4 to 6 μm. The thickness of the glass 19 coating the magnetic substance 18 is preferably 10 to 40 μm, and more preferably 15 to 30 μm, and even more preferably 20 to 25 μm.

The controlling of the thickness of the glass 19 by the composition of the glass 19 can provide the magnetic substance 18 with better oxidation resistance. From this point of view, the composition of the glass 19 and the corresponding preferable range of the thickness (μm) of the glass 19 are shown below:

$SiO_2$—MgO—$Al_2O_3$—ZnO: 1 to 10 μm;
ZnO—$La_2O_3$—$B_2O_3$—MgO—BaO—$SiO_2$—$Al_2O_3$: 5 to 15 μm;
$SiO_2$—CaO—ZnO—$Al_2O_3$—MgO: 5 to 15 μm;
BaO—$SiO_2$—MgO—$Al_2O_3$—$Y_2O_3$—$B_2O_3$: 15 to 25 μm;
BaO—$B_2O_3$—$SiO_2$: 20 to 25 μm;
BaO—$B_2O_3$—MgO—ZnO—$SiO_2$—$Al_2O_3$: 15 to 25 μm; and
Glass other than the above glass, which contains $SiO_2$—$Al_2O_3$—MgO—BaO: 20 to 25 μm.

The volume of the magnetic substance 18 is preferably 60 to 90% of the volume of the glass 19. The volume of the magnetic substance 18 of 60% or more of the volume of the glass 19 can lead to improvement of the heating efficiency by electromagnetic induction. The volume of the magnetic substance 18 of 90% or less of the volume of the glass 19 can lead to further improvement of the coating effect of the glass 19, which can provide further improved oxidation resistance of the magnetic substance 18. The volume of the magnetic substance 18 is more preferably 70 to 80%, and even more preferably 75 to 80%, of the volume of the glass 19.

The magnetic substance 18 is preferably composed of particles having a particle diameter of 30 μm or less. When the magnetic substance 18 is composed of particles having a particle diameter of 30 μm or less, the heating efficiency by electromagnetic induction is further improved. The magnetic substance 18 is more preferably composed of particles having a particle diameter of 20 μm or less. Further, in order to prevent frequency used in the electromagnetic induction from being excessively increased, the magnetic substance 18 is preferably composed of particles having a particle diameter of 5 μm or more. The particle diameter of the particles of the magnetic substance 18 can be measured by the intercept method as follows. That is, a cross-sectional view of the magnetic substance 18 is imaged by an SEM (scanning electron microscope), three arbitrary line segments are drawn in the cross-sectional view, and lengths of portions where the line segments and the magnetic material intersect are measured using image analysis software. An average of the resulting lengths is determined to be the particle diameter of the particles of the magnetic substance 18.

Although materials of the partition walls 12 and the outer peripheral wall 11 of the honeycomb structure 10 are not particularly limited, the honeycomb structure is required to be a porous body having a large number of pores. Therefore, the honeycomb structure 10 is typically formed of a ceramic material. Examples of the ceramic material include a sintered body of ceramics comprised of cordierite, silicon carbide, aluminum titanate, silicon nitride, mullite, alumina, a silicon-silicon carbide-based composite material, or silicon carbide-cordierite based composite material, in particular, a sintered body mainly based on a silicon-silicon carbide composite material or silicon carbide. As used herein, the expression "silicon carbide-based" means that the honeycomb structure 10 contains silicon carbide in an amount of 50% by mass or more of the entire honeycomb structure 10. The phrase "the honeycomb structure 10 is mainly based on a silicon-silicon carbide composite material" means that the honeycomb structure 10 contains 90% by mass or more of the silicon-silicon carbide composite material (total mass) based on the entire honeycomb structure 10. Here, for the silicon-silicon carbide composite material, it contains silicon carbide particles as an aggregate and silicon as a binding material for binding the silicon carbide particles, and a plurality of silicon carbide particles are preferably bonded by silicon so as to form pores between the silicon carbide particles. The phrase "the honeycomb structure 10 is mainly based on silicon carbide" means that the honeycomb structure 10 contains 90% by mass or more of silicon carbide (total mass) based on the entire honeycomb structure 10.

Preferably, the honeycomb structure 10 is formed of at least one ceramic material selected from the group consisting of cordierite, silicon carbide, aluminum titanate, silicon nitride, mullite, and alumina.

The shape of the cell 15 of the honeycomb structure 10 may be, but not particularly limited to, a polygonal shape such as a triangle, a quadrangle, a pentagon, a hexagon and an octagon; a circular shape; an ellipse shape; or irregular shapes, in a cross section orthogonal to the central axis of the honeycomb structure 10.

Further, an outer shape of the honeycomb structure 10 may be, but not particularly limited to, a shape such as a pillar shape with circular end faces (cylindrical shape), a pillar shape with oval end faces, and a pillar shape with polygonal (quadrangular, pentagonal, hexagonal, heptagonal, octagonal, and the like) end faces, and the like. Furthermore, the size of the honeycomb structure 10 is not particularly limited, and an axial length of the honeycomb structure is preferably from 40 to 500 mm. Further, for example, when the outer shape of the honeycomb structure 10 is cylindrical, a radius of each end face is preferably from 50 to 500 mm.

Each of the partition walls 12 of the honeycomb structure 10 preferably has a thickness of from 0.10 to 0.50 mm, and more preferably from 0.25 to 0.45 mm, in terms of ease of production. For example, the thickness of 0.10 mm or more improves the strength of the honeycomb structure 10. The thickness of 0.50 mm or less can result in lower pressure loss when the honeycomb structure 10 is used as a filter. It should be noted that the thickness of the partition walls 12 is an average value measured by a method for observing the axial cross section with a microscope.

Further, the partition walls 12 forming the honeycomb structure 10 preferably have a porosity of from 30 to 70%, and more preferably from 40 to 65%, in terms of ease of production. The porosity of 30% or more tends to decrease a pressure loss. The porosity of 70% or less can maintain the strength of the honeycomb structure 10.

The porous partition walls 12 preferably have an average pore size of from 5 to 30 μm, and more preferably from 10 to 25 μm. The average pore size of 5 μm or more can decrease the pressure loss when the honeycomb structure 10 is used as a filter. The average pore size of 30 μm or less can maintain the strength of the honeycomb structure 10.

The honeycomb structure 10 preferably has a cell density in a range of from 5 to 93 cells/cm$^2$, and more preferably 5 to 63 cells/cm$^2$, and even more preferably in a range of from 31 to 54 cells/cm$^2$, although not particularly limited thereto.

Such a honeycomb structure 10 is produced by forming a green body containing a ceramic raw material into a honeycomb shape having partition walls 12 that penetrate from one end face to other end face and define a plurality of cells 15 to form flow paths for a fluid, to form a honeycomb formed body, and drying the honeycomb formed body and then firing it. When such a honeycomb structure is used as the honeycomb structure 10 according to the present embodiment, the outer peripheral wall may be integrally extruded with a honeycomb structure portion, which is used as the outer peripheral wall as it is, or an outer circumference of the honeycomb formed body (honeycomb structure) may be ground and shaped into a predetermined shape after forming or firing it, and a coating material may be applied to the outer circumference-ground honeycomb structure to form an outer peripheral coating. In the honeycomb structure 10 of this embodiment, for example, a honeycomb structure having an outer circumference without grinding the outermost circumference of the honeycomb structure may be used, and the coating material may be further applied onto the outer peripheral surface of the honeycomb structure having the outer circumference (that is, a further outer side of the outer circumference of the honeycomb structure) to form the outer coating. That is, in the former case, only the outer peripheral coating made of the coating material forms the outer peripheral surface positioned on the outermost circumference. On the other hand, in the latter case, an outer peripheral wall having a two-layered structure positioned on the outermost periphery is formed in which the outer peripheral coating made of the coating material is further laminated on the outer peripheral surface of the honeycomb structure. The outer peripheral wall may be extruded integrally with the honeycomb structure portion and fired as it is, which may be used as the outer peripheral wall without processing the outer circumference.

A composition of the coating material is not particularly limited, and various known coating materials can be appropriately used. The coating material may further contain colloidal silica, an organic binder, clay and the like. The organic binder is preferably used in an amount of from 0.05 to 0.5% by mass, and more preferably from 0.1 to 0.2% by mass. Further, the clay is preferably used in an amount of from 0.2 to 2.0% by mass, and more preferably from 0.4 to 0.8% by mass.

The honeycomb structure 10 is not limited to an integral type honeycomb structure 10 in which the partition walls 12 are integrally formed. For example, the honeycomb structure 10 may be a honeycomb structure 10 in which pillar shaped honeycomb segments each having a plurality of cells 15 defined by the porous partition walls 12 to form flow paths for a fluid are combined via joining material layers (which, hereinafter, may be referred to as a "joined honeycomb structure").

The honeycomb structure 10 can be a honeycomb structure with joined honeycomb segments obtained by, using each of fired honeycomb structures as a honeycomb segment, joining and integrating the side faces of the plurality of honeycomb segments with a joining material. For example, the honeycomb structure in which the honeycomb segments are joined can be produced as follows.

First, the joining material is applied to joining surfaces (side surfaces) of each honeycomb segment while attaching joining material adhesion preventing masks to both end faces of each honeycomb segment. These honeycomb segments are then arranged adjacent to each other such that the side surfaces of the honeycomb segments are opposed to each other, and the adjacent honeycomb segments are pressure-bonded together, and then heated and dried. Thus, the honeycomb structure in which the side surfaces of the adjacent honeycomb segments are joined with the joining material is produced. For the honeycomb structure, the outer peripheral portion may be ground into a desired shape (for example, a cylindrical shape), and the coating material may be applied to the outer peripheral surface, and then heated and dried to form an outer peripheral wall 11.

The material of the joining material adhesion preventing mask that can be suitably used herein includes, but not particularly limited to, synthetic resins such as polypropylene (PP), polyethylene terephthalate (PET), polyimide, Teflon (registered trademark) and the like. Further, the mask is preferably provided with an adhesive layer, and the material of the adhesive layer is preferably an acrylic resin, a rubber (for example, a rubber mainly based on a natural rubber or a synthetic rubber), or a silicon resin.

Examples of the joining material adhesion preventing mask that can be suitable used herein include an adhesive film having a thickness of from 20 to 50 μm.

The joining material that can be used herein may be prepared by, for example, mixing ceramic powder, a dispersion medium (for example, water or the like), and optionally additives such as a binder, a deflocculant and a foaming resin. The ceramics may be preferably ceramics containing at least one selected from the group consisting of cordierite, mullite, zircon, aluminum titanate, silicon carbide, silicon nitride, zirconia, spinel, indialite, sapphirine, corundum, and titanic, and more preferably having the same material as that of the honeycomb structure. The binder includes polyvinyl alcohol, methyl cellulose, CMC (carboxymethyl cellulose) and the like.

Next, the method for producing the honeycomb structure 10 will be described. First, the honeycomb structure having the porous partition walls and the plurality of cells defined by the partition walls is produced. For example, when producing the honeycomb structure made of cordierite, a cordierite-forming raw material is firstly prepared as a green body. The cordierite-forming raw material contains a silica source component, a magnesia source component, and an alumina source component, and the like, in order to formulate each component so as to have a theoretical composition of cordierite crystal. Among them, the silica source component that can be used herein includes preferably quartz and fused silica, and the particle diameter of the silica source component is preferably from 100 to 150 μm.

Examples of the magnesia source component include talc and magnesite. Among them, talc is preferred. The talc is preferably contained in an amount of from 37 to 43% by mass in the cordierite-forming raw material. The talc preferably has a particle diameter (average particle diameter) of from 5 to 50 μm, and more preferably from 10 to 40 μm. Further, the magnesia (MgO) source component may contain $Fe_2O_3$, CaO, $Na_2O$, $K_2O$ and the like as impurities.

The alumina source component preferably contains at least one of aluminum oxide and aluminum hydroxide, in terms of fewer impurities. Further, aluminum hydroxide is preferably contained in an amount of from 10 to 30% by mass, and aluminum oxide is preferably contained in an amount of from 0 to 20% by mass, in the cordierite-forming raw material.

A material for a green body to be added to the cordierite-forming raw material (additive) is then prepared. At least a binder and a pore former are used as additives. In addition to the binder and the pore former, a dispersant or a surfactant can be used.

The pore former that can be used herein includes a substance that can be oxidatively removed by reacting with oxygen at a temperature equal to or lower than a firing temperature of cordierite, or a low melting point reactant having a melting point at a temperature equal to or lower than the firing temperature of cordierite, or the like. Examples of the substance that can be oxidatively removed include resins (particularly particulate resins), graphite (particularly particulate graphite) and the like. Examples of the low melting point reactant that can be used herein include at least one metal selected from the group consisting of iron, copper, zinc, lead, aluminum, and nickel, alloys mainly based on those metals (e.g., carbon steel and cast iron for iron, and stainless steel), or alloys mainly based on two or more of those metals. Among them, the low melting point reactant is preferably an iron alloy in the form of powder or fiber. Further, the low melting point reactant preferably has a particle diameter or a fiber diameter (an average diameter) of from 10 to 200 μm. Examples of a shape of the low melting point reactant include a spherical shape, a wound-lozenge shape, a confetti shape, and the like. These shapes are preferable because the shape of the pores can be easily controlled.

Examples of the binder include hydroxypropylmethyl cellulose, methyl cellulose, hydroxyethyl cellulose, carboxymethyl cellulose, polyvinyl alcohol and the like. Further, examples of the dispersant include dextrin, polyalcohol and the like. Furthermore, examples of the surfactant include fatty acid soaps. The additive may be used alone or in combination of two or more.

Subsequently, to 100 parts by mass of the cordierite-forming raw material are added from 3 to 8 parts by mass of the binder, from 3 to 40 parts by mass of the pore former, from 0.1 to 2 parts by mass of the dispersant, and from 10 to 40 parts by mass of water, and these materials for a green body are kneaded to prepare a green body.

The prepared green body is then formed into a honeycomb shape by an extrusion molding method, an injection molding method, a press molding method, or the like to obtain a raw honeycomb formed body. The extrusion molding method is preferably employed, because continuous molding is easy, and, for example, cordierite crystals can be oriented. The extrusion molding method can be performed using an apparatus such as a vacuum green body kneader, a ram type extrusion molding machine, a twin-screw type continuous extrusion molding machine, or the like.

The honeycomb formed body is then dried and adjusted to a predetermined size to obtain a honeycomb dried body. The honeycomb formed body can be dried by hot air drying, microwave drying, dielectric drying, drying under reduced pressure, vacuum drying, freeze drying and the like. It is preferable to perform combined drying of the hot air drying and the microwave drying or dielectric drying, because the entire honeycomb formed body can be rapidly and uniformly dried.

Subsequently, a raw material for the plugged portions is prepared. The material for the plugged portions (plugging slurry) may use the same material for a green body as that of the partition walls (honeycomb dried body), or may use a different material. Specifically, the raw material for the plugged portions can be obtained by mixing a ceramic raw material, a surfactant, and water, and optionally adding a sintering aid, a pore former and the like to form a slurry, which is kneaded using a mixer or the like.

Subsequently, masks are applied onto some of cell opening portions on one end face of the honeycomb dried body, and the end face is immersed in a storage container in which the plugging slurry is stored to fill the non-masked cells with the plugging slurry. Similarly, masks are applied onto some of cell opening portions on the other end face of the honeycomb dried body, and the end face is immersed in a storage container in which the plugging slurry is stored to fill the non-masked cells with the plugging slurry. Thus, both ends of each cell are plugged. It is then dried and fired to obtain a honeycomb structure having plugged portions. As the drying conditions, the same conditions as those for drying the honeycomb formed body can be used. Further, the conditions for the above firing can be typically in an air atmosphere at a temperature of 1410 to 1440° C. for 3 to 15 hours, when the cordierite-forming raw material is used.

A method of plugging is simply carried out by pushing a paste-like material into the cells with a spatula such as a squeegee. It is easy to control the depth by the number of squeegee processes to be pushed. The number of pushing processes is increased for the portions of the cells desired to insert the plugged portion deeply, and the number of pushing processes is decreased for shallow portions around the former cells.

Further, when the resulting honeycomb structure is produced in a state where the outer peripheral wall is formed on the outer peripheral surface of the honeycomb structure, the outer peripheral surface may be ground to remove the outer peripheral wall. The coating material is applied to the outer circumference of the honeycomb structure from which the outer peripheral wall has thus been removed, in a subsequent step, to form an outer peripheral coating. Further, when grinding the outer peripheral surface, a part of the outer peripheral wall may be ground and removed, and on that part, the outer peripheral coating may be formed by the coating material. When preparing the coating material, it can be prepared using, for example, a biaxial rotary type vertical mixer.

Further, the coating material may further contain colloidal silica, an organic binder, clay and the like. The content of the organic binder is preferably from 0.05 to 0.5% by mass, and more preferably from 0.1 to 0.2% by mass. The content of the clay is preferably from 0.2 to 2.0% by mass, and more preferably from 0.4 to 0.8% by mass.

The coating material is applied onto the outer peripheral surface of the honeycomb structure previously produced, and the applied coating material is dried to form an outer peripheral coating. Such a structure can allow for effective suppression of cracking in the outer peripheral coating during the drying and the heat treatment.

Examples of a method for coating the coating material can include a method for applying the coating material by placing the honeycomb structure on a rotating table and rotating it, and pressing a blade-shaped applying nozzle along the outer peripheral portion of the honeycomb structure while discharging the coating material from the applying nozzle. Such a configuration can allow the coating material to be applied with a uniform thickness. Further, this method can lead to a decreased surface roughness of the formed outer peripheral coating, and can result in an outer peripheral coating that has an improved appearance and is difficult to be broken by thermal shock.

When the outer peripheral surface of the honeycomb structure is ground and the outer peripheral wall is removed, the coating material is applied onto the entire outer peripheral surface of the honeycomb structure to form the outer peripheral coating. On the other hand, when the outer peripheral wall is present on the outer peripheral surface of the honeycomb structure or a part of the outer peripheral wall is removed, the coating material may be partially applied to form the outer peripheral coating, or the coating material may be, of course, applied onto the entire outer peripheral surface of the honeycomb structure to form the outer peripheral coating.

The method for drying the applied coating material (i.e., the undried outer peripheral coating) is not limited, but in terms of preventing dry-cracking, it can suitably use, for example, a method of drying 25% or more of a water content in the coating material by maintaining the coating material at room temperature for 24 hours or more, and then maintaining it in an electric furnace at 600° C. for 1 hour or more to remove moisture and organic matters.

Further, when the opening portions of the cells of the honeycomb structure are not plugged in advance, plugging may be performed in the opening portions of the cells after forming the outer peripheral coating.

Furthermore, the silicon carbide powder contained in the coating material develops color by irradiating the outer peripheral surface of the resulting honeycomb structure with laser. Therefore, product information or the like may be printed (marked) on the outer peripheral coating of the resulting honeycomb structure by irradiating it with laser light.

Preferred examples of laser light used for marking with laser include carbon dioxide gas ($CO_2$) laser, YAG laser and $YVO_4$ laser. Laser conditions for irradiation with the laser light can be appropriately selected according to the type of the laser to be used. For example, when the $CO_2$ laser is used, the marking is preferably carried out at an output of from 15 to 25 W and a scan speed of from 400 to 600 mm/s.

Such a marking method allows the irradiated portion to develop color so as to present dark color such as black to green, resulting in very good contrast due to color development to the non-irradiated portion.

Next, the magnetic substance coated with the glass is provided in the cells of the honeycomb structure. More particularly, materials in which glass powder is adhered and coated around the magnetic substance powder are provided in the cells, and as this method, a rolling granulator, a coating with a fluidized bed granulator, a CVD method, a sol-gel method, a mechano-fusion method or the like can be used. Herein, the formation of the coating layer in the rolling granulator will be described as an example. First, a binder, a dispersant and a solvent are mixed with the glass powder having an average particle diameter of 1 to 10 μm to prepare a slurry for coating. The slurry is then sprayed with an air spray while rotating the metal magnetic powder with the rolling granulator to perform granulation. In this case, the film thickness of the glass can be adjusted by the amount of slurry to be sprayed. The powder thus obtained can be dried by heating at 100° C. using, for example, a dryer. The above powder, binder, dispersant and water are then mixed together to prepare a paste, and the paste is injected into the cells of the honeycomb structure using a syringe. Subsequently, after drying and degreasing, the partition walls of the cells can be baked in a vacuum atmosphere to provide coating layers on the partition walls of the cells of the honeycomb structure. Each coating layer is composed of the magnetic substance coated with the glass provided in the form of layer on the surfaces of the partition walls in the cells. The preparation of the coating layer is not limited to the wet film forming means using the above slurry, and may be carried out by, for example, a dry film forming method in which magnetic powder coated with the glass is directly attached to the walls of the cells.

Embodiment 2

Figure 4:
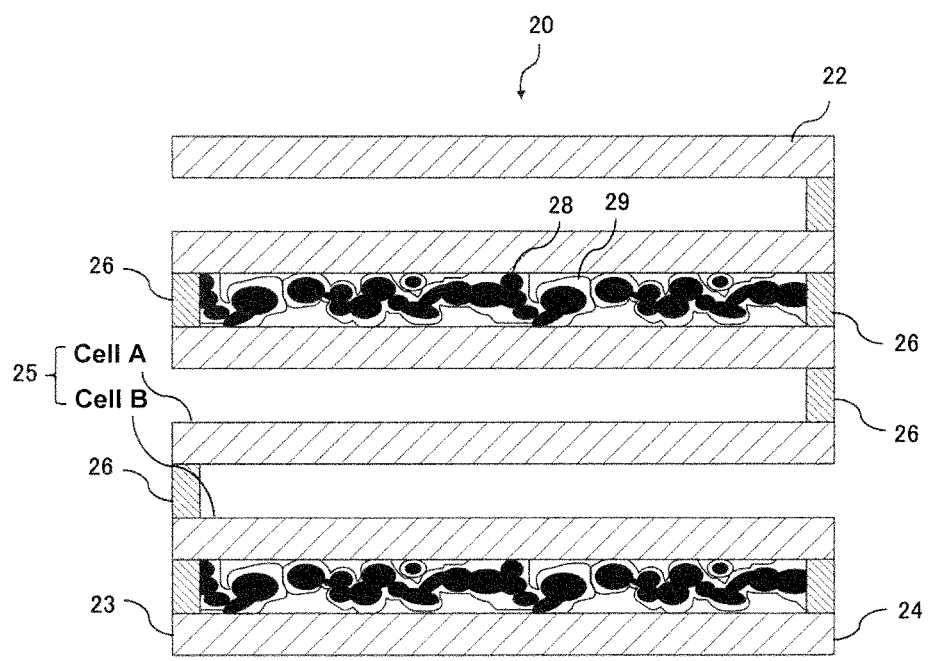
FIG. 4 is a cross-sectional view schematically showing a cross section of a honeycomb structure according to Embodiment 2 of the present invention, which is parallel to an extending direction of cells.

Next, a honeycomb structure 20 according to Embodiment 2 of the present invention will be described. FIG. 4 is a cross-sectional view schematically showing a cross section of the honeycomb structure 20 according to Embodiment 2 of the present invention, which is parallel to an extending direction of cells 25. The honeycomb structure 20 is structured in a pillar shape, and include an outer peripheral wall and porous partition walls 22 which are arranged on an inner side of the outer peripheral wall and define a plurality of cells 25 that penetrate from one end face 23 to the other end face 24 to form flow paths.

In the honeycomb structure 20, the cells 25 includes a plurality of cells A which are opened on one end face 23 and have plugged portions 26 on the other end face 24, and a plurality of cells B which are opened on the other end face 24 side and have the plugged portions 26 on one end face 23, the cells B being arranged alternately with the cells A.

Further, at least one cell 25 of the honeycomb structure 20 is filled with a magnetic substance 28 coated with glass 29. In the honeycomb structure 20, the cell 25 is thus filled with the magnetic substance 28 coated with the glass 29, so that the oxidation resistance is improved. Further, according to such a structure, even if the magnetic substance 28 is composed of fine particles and is very easily oxidized by itself, the coating with the glass 29 can improve the oxidation resistance.

Here, the phrase "the cell 25 is filled with the magnetic substance 28 coated with the glass 29" means that the cell 25 is filled at an appropriate gap as shown in FIG. 4. A filling percentage of the magnetic substance 28 coated with the glass 29 in the cell 25 is preferably 40 to 80%, and more preferably 60 to 70%. The filling percentage of the magnetic substance 28 coated with the glass 29 can be calculated from an area ratio of the pores including open gap portions in the cells 25, and the glass 29 and the magnetic substance 28, by performing SEM imaging and image analysis of the glass 29 and the magnetic substance 28 filled in the cell 25. It may also be calculated by the Archimedes method.

The structures of the glass 29 of the honeycomb structure 20 and the magnetic substance 28 coated with the glass 29 according to Embodiment 2 may employ the same structures of the glass 19 of the honeycomb structure 10 and the magnetic substance 18 coated with the glass 19 according to Embodiment 1. However, the magnetic substance 18 of the honeycomb structure 10 according to Embodiment 1 is preferably composed of particles having a particle diameter of 30 μm or less, whereas the magnetic substance 28 of the honeycomb structure 20 according to Embodiment 2 is preferably composed of particles having a particle diameter of 300 μm or less. According to such structures, the heating efficiency by electromagnetic induction is further improved. Further, in order to prevent frequency used in the electromagnetic induction from being excessively increased, the magnetic substance 28 is preferably composed of particles having a particle diameter of 5 μm or more. The particle diameter of the particles of the magnetic substance 28 can be measured by the method as follows. That is, a cross-sectional view of the magnetic substance 28 is imaged by an SEM (scanning electron microscope), three arbitrary line segments are drawn in the cross-sectional view, and lengths of portions where the line segments and the magnetic substance intersect are measured using image analysis software. An average of the resulting lengths is determined to be the particle diameter of the particles of the magnetic substance 28.

The magnetic substance 28 of the honeycomb structure 20 preferably forms a magnetic substance portion made of the porous body. As used herein, the magnetic substance portion refers to collected particles of the magnetic substance 28. According to such a structure, the thermal impact resistance is improved, so that the generation of cracks can be satisfactorily suppressed in the magnetic substance portion generated at an elevated temperature.

The method for producing the honeycomb structure 20 according to Embodiment 2 of the present invention is carried out by the same method for producing the honeycomb structure 10 according to Embodiment 1 of the present invention, with the exception that the former fills the cells with the magnetic substance coated with the glass in the dried honeycomb body. Further, in the method for producing the honeycomb structure 20, the method of filling the cells with the magnetic substance coated with the glass can be caried out by pouring the magnetic substance particles coated with the glass into the predetermined cell(s) of the honeycomb fired body and firing it. In this case, the magnetic substance particles coated with the glass may be poured into the cell(s) while vibrating the honeycomb structure using a vibrator or the like. Such a method can suppress clogging and bias of the coating material in the cells.

<2. Exhaust Gas Purifying Device>

Figure 5:
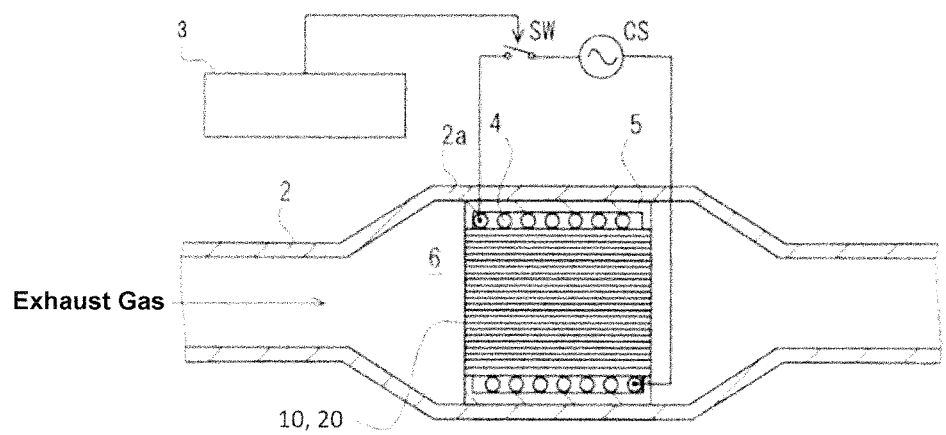
FIG. 5 is a schematic view of an exhaust gas flow path of an exhaust gas purifying device incorporating a honeycomb structure according to Embodiment 1 or 2.

Using the honeycomb structure according to each embodiment of the present invention as described above, an exhaust gas purifying device can be formed. As an example, FIG. 5 shows a schematic view of an exhaust gas flow path of an exhaust gas purifying device 6 including the honeycomb structure 10 or the honeycomb structure 20. The exhaust gas purifying device 6 includes the honeycomb structure 10, 20 and a coil wiring 4 that spirally surrounds the outer circumference of the honeycomb structure 10, 20. Also, the exhaust gas purifying device 6 has a metal pipe 2 for housing the honeycomb structure 10, 20 and the coil wiring 4. The exhaust gas purifying device 6 can be arranged in an increased diameter portion 2a of the metal pipe 2. The coil wiring 4 may be fixed to the interior of the metal pipe 2 by a fixing member 5. The fixing member 5 is preferably a heat-resistant member such as ceramic fibers. The honeycomb structure 10, 20 may support a catalyst.

The coil wiring 4 is spirally wound around the outer circumference of the honeycomb structure 10, 20. It is also assumed that two or more coil wirings 4 are used. An AC current supplied from an AC power supply CS flows through the coil wiring 4 in response to turning on (ON) of a switch SW, and as a result, a magnetic field that periodically changes is generated around the coil wiring 4. The on/off of the switch SW is controlled by a control unit 3. The control unit 3 can turn on the switch SW in synchronization with the start of an engine and pass an alternating current through the coil wiring 4. It is also assumed that the control unit 3 turns on the switch SW regardless of the start of the engine (for example, in response to an operation of a heating switch pushed by a driver).

In the present disclosure, a temperature of the honeycomb structure 10, 20 is increased in response to the change of the magnetic field according to the alternating current flowing through the coil wiring 4. Based on this, carbon fine particles and the like collected by the honeycomb structure 10, 20 are burned out. Also, when the honeycomb structure 10, 20 supports the catalyst, the increase in the temperature of the honeycomb structure 10, 20 raises a temperature of the catalyst supported by the catalyst support contained in the honeycomb structure 10, 20 and promotes the catalytic reaction. Briefly, carbon monoxide (CO), nitrogen oxide ($NO_x$), and hydrocarbon (CH) are oxidized or reduced to carbon dioxide ($CO_2$), nitrogen ($N_2$), and water ($H_2O$).

EXAMPLES

Hereinafter, the present invention will be specifically described based on Examples. However, the present invention is not limited to Examples.

Example 1

A rectangular honeycomb substrate having 20 mm×12 mm×25 mm was cut out from a cordierite honeycomb having a thickness of the partition wall of 0.1 mm and a distance between the partition walls of about 1 mm. In the honeycomb substrate, there were 15 cells×9 cells in a cross section of 20 mm×12 mm.

Separately, a paste was prepared from particles of a magnetic substance with glass coated around it by granulation, and a binder, a dispersant, and water.

The paste was then injected inside the partition walls of the honeycomb substrate at intervals of one cell per 5 cells×5 cells using a syringe, and a total of 6 cells were coated. It was dried, degreased in an $N_2$ atmosphere at 500° C. for 5 hours, and fired in an Ar atmosphere at 1100° C. for 1 hour to prepare a sample of the honeycomb structure in which the magnetic substance coated with the glass was provided in the form of layer on the surfaces of the partition walls in the cells to form coating layers.

For the magnetic substance, the balance Fe-49% by mass of Co-2% by mass of V powder having an average particle diameter D50 of 10 μm was used. For the above glass, $SiO_2$—$Al_2O_3$—MgO—BaO was used.

Further, the coating layers in the cells formed in Example 1 are composed of the magnetic substance coated with the glass.

Example 2

The same rectangular cordierite honeycomb substrate as that of Example 1 was prepared.

Next, particles of a magnetic substance coated with glass around it by granulation were poured inside the partition walls of the honeycomb substrate at intervals of one cell per 5 cells×5 cells, and filled in a total of 6 cells. It was then fired in an Ar atmosphere at 1100° C. for 1 hour to prepare a sample of a honeycomb structure in which the cells were filled with the magnetic substance coated with the glass.

For the magnetic substance, the balance Fe-49% by mass of Co-2% by mass of V powder having an average particle diameter D50 of 60 μm was used. For the above glass, $SiO_2$—$Al_2O_3$—MgO—BaO was used.

Examples 3 to 7

Each sample of the honeycomb structures was prepared by the same method as that of Example 1, except for the use of different magnetic substance and glass.

For the magnetic substance, the balance Fe-17% by mass of Co powder having an average particle diameter D50 of 10 μm was used. For the above glass, $SiO_2$—MgO—$Al_2O_3$—ZnO was used.

Examples 8 to 10

Each sample of the honeycomb structures was prepared by the same method as that of Example 2, except for the use of different magnetic substance and glass.

For the magnetic substance, the balance Fe-17% by mass of Co powder having an average particle diameter D50 of 60 μm was used. For the above glass, $SiO_2$—MgO—$Al_2O_3$—ZnO was used.

Examples 11 to 14

Each sample of the honeycomb structures was prepared by the same method as that of Example 1, except for the use of different magnetic substance and glass.

For the magnetic substance, the balance Fe-17% by mass of Co powder having an average particle diameter D50 of 10 μm was used. For the above glass, ZnO—$La_2O_3$—$B_2O_3$—MgO—BaO—$SiO_2$—$Al_2O_3$ was used.

Examples 15 to 17

Each sample of the honeycomb structures was prepared by the same method as that of Example 1, except for the use of different magnetic substance and glass.

For the magnetic substance, the balance Fe-17% by mass of Co powder having an average particle diameter D50 of 10 μm was used. For the above glass, $SiO_2$—CaO—ZnO—$Al_2O_3$—MgO was used.

Examples 18 to 19

Each sample of the honeycomb structures was prepared by the same method as that of Example 1, except for the use of different magnetic substance and glass.

For the magnetic substance, the balance Fe-17% by mass of Co powder having an average particle diameter D50 of 10 μm was used. For the above glass, BaO—SiO$_2$—MgO—Al$_2$O$_3$—Y$_2$O$_3$—B$_2$O$_3$ was used.

Examples 20 to 21

Each sample of the honeycomb structures was prepared by the same method as that of Example 1, except for the use of different magnetic substance and glass.

For the magnetic substance, the balance Fe-17% by mass of Co powder having an average particle diameter D50 of 10 μm was used. For the above glass, BaO—B$_2$O$_3$—SiO$_2$ was used.

Examples 22 to 24

Each sample of the honeycomb structures was prepared by the same method as that of Example 1, except for the use of different magnetic substance and glass.

For the magnetic substance, the balance Fe-17% by mass of Co powder having an average particle diameter D50 of 10 μm was used. For the above glass, BaO—B$_2$O$_3$—MgO—ZnO—SiO$_2$—Al$_2$O$_3$ was used.

Comparative Example 1

The same rectangular cordierite honeycomb substrate as that of Example 1 was prepared.

A paste was then prepared from magnetic substance powder, a binder, a dispersant, and water, and the paste was then injected inside the partition walls of the honeycomb substrate at intervals of one cell per 5 cells×5 cells using a syringe, and a total of 6 cells were coated. It was then dried, degreased in an N$_2$ atmosphere at 500° C. for 5 hours, and fired in an Ar atmosphere at 1100° C. for 1 hour to prepare a sample of the honeycomb structure in which the magnetic substance was provided in the form of layer on the surfaces of the partition walls in the cells to form coating layers.

For the magnetic substance, the balance Fe-49% by mass of Co-2% by mass of V powder having an average particle diameter D50 of 10 μm was used.

Further, the coating layers in the cells formed in Comparative Example 1 are made of the magnetic substance.

Comparative Example 2

The same rectangular cordierite honeycomb substrate as that of Example 1 was prepared.

Next, magnetic substance powder was poured inside the partition walls of the honeycomb substrate at intervals of one cell per 5 cells×5 cells, and filled in a total of 6 cells. It was then fired in an Ar atmosphere at 1100° C. for 1 hour to prepare a sample of a honeycomb structure in which the cells were filled with the magnetic substance.

For the magnetic substance, the balance Fe-49% by mass of Co-2% by mass of V powder having an average particle diameter D50 of 60 μm was used.

Comparative Example 3

A sample of the honeycomb structure was prepared by the same method as that of Comparative Example 1, except for the use of different magnetic substance.

For the magnetic substance, the balance Fe-17% by mass of Co powder having an average particle diameter D50 of 10 μm was used.

Comparative Example 4

A sample of the honeycomb structure was prepared by the same method as that of Comparative Example 2, except for the use of different magnetic substance.

For the magnetic substance, the balance Fe-17% by mass of Co powder having an average particle diameter D50 of 60 μm was used.

(Oxidation Test)

To simulate the temperature during induction heating, each of the honeycomb structures according to Examples 1 to 24 and Comparative Examples 1 to 4 was heated at 600° C. for 1 hour using an electric furnace.

Subsequently, an oxidation ratio (%) of the magnetic substance after heating was calculated based on the following equations (1) and (2):

$$\text{"oxidation ratio of magnetic substance after heating"} = [(\text{mass increasing ratio due to oxidation of magnetic substance})/(\text{mass increasing ratio when magnetic substance is completely oxidized})] \times 100(\%); \text{ and} \quad (1)$$

$$\text{"mass increasing ratio due to oxidation of magnetic substance"} = [(\text{total mass of honeycomb structure after heating} - \text{total mass of honeycomb structure before heating})/\text{total mass of magnetic substance before heating}] \times 100(\%). \quad (2)$$

It should be note that the "mass increasing ratio when magnetic substance is completely oxidized" in the above equation (1) is a theoretical value, which is determined by calculating a ratio of an amount of mass increased when all the metals in the magnetic substance are converted to oxides (Fe is converted to Fe$_2$O$_3$, Co is converted to CoO, V is converted to V$_2$O$_5$). More particularly, it was 0.35 when the magnetic substance was the balance Fe-49% by mass of Co-2% by mass of V, and 0.40 when the magnetic substance was the balance Fe-17% by mass of Co.

Further, samples having the oxidation ratio (%) of the magnetic substance after heating of 30% or less are evaluated as having good oxidation resistance (A), and those having the oxidation ratio of more than 30% are evaluated as having poor oxidation resistance (B).

(Ratio of Thermal Expansion Coefficients of Magnetic Substance and Glass)

For each sample, the ratio of the thermal expansion coefficient α1 of the magnetic substance to the thermal expansion coefficient α2 of the glass: α1/α2 was calculated. Each thermal expansion coefficient was a value at 900° C. when 25° C. was used as a reference temperature.

(Measurement of Open Porosity, Filling Percentage, Thickness of Coating Layer, Thickness of Glass, and Particle Diameter of Magnetic Particles)

Figure 6:
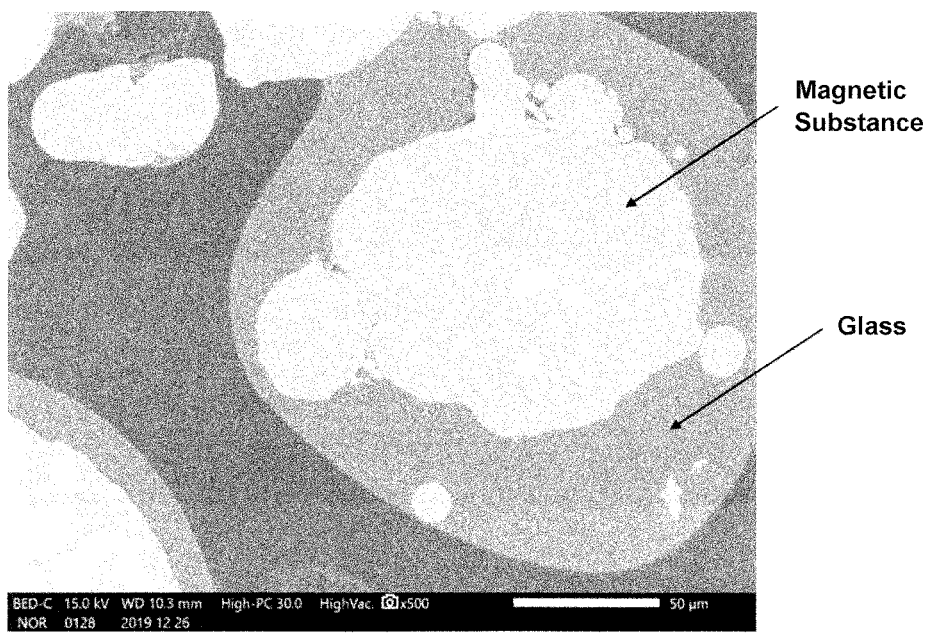
FIG. 6 is an SEM image of a cross section of a magnetic substance portion of a honeycomb structure according to Embodiment 2.

For each sample, each of the open porosity of the coating layer (Examples 1, 3 to 7, 11 to 24 and Comparative Examples 1, 3) and the filling percentage of the magnetic substance coated with the glass (Examples 2, 8 to 10 and Comparative Examples 2 and 4), the thickness of the coating layer, the thickness of the glass, and the particle diameter of the magnetic particles was measured by image analysis from the SEM image of the cross section of the magnetic substance of each honeycomb structure as shown in FIG. 6. It should be noted that FIG. 6 is an SEM image of a cross section of a magnetic substance portion of the honeycomb structure according to Embodiment 2. The open porosity of the coating layer and the filling percentage of the magnetic substance were measured by observing 5 fields of view at magnifications of 200 and calculated from an average thereof. The thickness of the coating layer was measured at magnifications of 200 and the thickness of the glass was measured at magnifications of 500 by observing three fields of view, respectively, and 10 points were measured per one field of view, and an average thereof was determined to be each thickness. The particle diameter of the magnetic substance was measured by the intercept method using the SEM image observed at magnifications of 200. That is, the cross-sectional view of the magnetic substance was imaged by SEM, three arbitrary line segments were drawn in the cross-sectional view, and the lengths of the portions where the line segments and the magnetic substance intersected were measured using image analysis software. An average of the resulting lengths was then determined to be the particle diameter of the magnetic particles.

The evaluation results are shown in Table 1.

TABLE 1

| | | Composition of Magnetic Substance | Particle Diameter of Magnetic Particles (μm) | Composition of Glass |
|---|---|---|---|---|
| Ex. | 1 | Balance Fe-49% by mass Co-2% by mass V | 9 | SiO2—Al2O3—MgO—BaO |
| | 2 | Balance Fe-49% by mass Co-2% by mass V | 57 | SiO2—Al2O3—MgO—BaO |
| | 3 | Balance Fe-17% by mass Co | 8 | SiO2—MgO—Al2O3—ZnO |
| | 4 | Balance Fe-17% by mass Co | 8 | SiO2—MgO—Al2O3—ZnO |
| | 5 | Balance Fe-17% by mass Co | 8 | SiO2—MgO—Al2O3—ZnO |
| | 6 | Balance Fe-17% by mass Co | 8 | SiO2—MgO—Al2O3—ZnO |
| | 7 | Balance Fe-17% by mass Co | 8 | SiO2—MgO—Al2O3—ZnO |
| | 8 | Balance Fe-17% by mass Co | 54 | SiO2—MgO—Al2O3—ZnO |
| | 9 | Balance Fe-17% by mass Co | 54 | SiO2—MgO—Al2O3—ZnO |
| | 10 | Balance Fe-17% by mass Co | 54 | SiO2—MgO—Al2O3—ZnO |
| | 11 | Balance Fe-17% by mass Co | 8 | ZnO—La2O3—B2O3—MgO—BaO—SiO2—Al2O3 |
| | 12 | Balance Fe-17% by mass Co | 8 | ZnO—La2O3—B2O3—MgO—BaO—SiO2—Al2O3 |
| | 13 | Balance Fe-17% by mass Co | 8 | ZnO—La2O3—B2O3—MgO—BaO—SiO2—Al2O3 |
| | 14 | Balance Fe-17% by mass Co | 8 | ZnO—La2O3—B2O3—MgO—BaO—SiO2—Al2O3 |
| | 15 | Balance Fe-17% by mass Co | 8 | SiO2—CaO—ZnO—Al2O3—MgO |
| | 16 | Balance Fe-17% by mass Co | 8 | SiO2—CaO—ZnO—Al2O3—MgO |
| | 17 | Balance Fe-17% by mass Co | 8 | SiO2—CaO—ZnO—Al2O3—MgO |
| | 18 | Balance Fe-17% by mass Co | 8 | BaO—SiO2—MgO—Al2O3—Y2O3—B2O3 |
| | 19 | Balance Fe-17% by mass Co | 8 | BaO—SiO2—MgO—Al2O3—Y2O3—B2O3 |
| | 20 | Balance Fe-17% by mass Co | 8 | BaO—B2O3—SiO2 |
| | 21 | Balance Fe-17% by mass Co | 8 | BaO—B2O3—SiO2 |
| | 22 | Balance Fe-17% by mass Co | 8 | BaO—B2O3—MgO—ZnO—SiO2—Al2O3 |
| | 23 | Balance Fe-17% by mass Co | 8 | BaO—B2O3—MgO—ZnO—SiO2—Al2O3 |
| | 24 | Balance Fe-17% by mass Co | 8 | BaO—B2O3—MgO—ZnO—SiO2—Al2O3 |
| Comp. | 1 | Balance Fe-49% by mass Co-2% by mass V | 12 | — |
| | 2 | Balance Fe-49% by mass Co-2% by mass V | 60 | — |
| | 3 | Balance Fe-17% by mass Co | 8 | — |
| | 4 | Balance Fe-17% by mass Co | 58 | — |

| | | Thermal Expansion Ratio of Magnetic Substance and Glass | Open Porosity of Coating Layer | Filling Percentage of magnetic Substance | Thickness of Coating Layer (μm) | Thickness of Glass (μm) | Mass Increasing Ratio of Magnetic Substance after Oxidation Test | Oxidation Ratio of Magnetic Substance after Oxidation Test | Oxidation Resistance Evaluation |
|---|---|---|---|---|---|---|---|---|---|
| Ex. | 1 | 1.1 | 48% | — | 60 | 16 | 7.5% | 21% | A |
| | 2 | 1.1 | — | 42% | — | 23 | 8.2% | 23% | A |
| | 3 | 1.2 | 60% | — | 45 | 15 | less than 1% | less than 1% | A |
| | 4 | 1.2 | 62% | — | 40 | 10 | less than 1% | less than 1% | A |
| | 5 | 1.2 | 63% | — | 37 | 5 | less than 1% | less than 1% | A |
| | 6 | 1.2 | 65% | — | 42 | 2 | less than 1% | 2% | A |
| | 7 | 1.2 | 59% | — | 49 | 1 | 2.0% | 5% | A |
| | 8 | 1.2 | — | 32% | — | 15 | less than 1% | less than 1% | A |
| | 9 | 1.2 | — | 35% | — | 2 | less than 1% | less than 1% | A |
| | 10 | 1.2 | — | 32% | — | 1 | 2.4% | 6% | A |
| | 11 | 1.1 | 63% | — | 37 | 20 | less than 1% | less than 1% | A |
| | 12 | 1.1 | 57% | — | 46 | 10 | 2.0% | 5% | A |
| | 13 | 1.1 | 55% | — | 42 | 5 | 4.6% | 11% | A |
| | 14 | 1.1 | 61% | — | 38 | 2 | 9.8% | 24% | A |
| | 15 | 1.1 | 65% | — | 51 | 20 | less than 1% | less than 1% | A |
| | 16 | 1.1 | 63% | — | 46 | 10 | less than 1% | less than 1% | A |
| | 17 | 1.1 | 58% | — | 44 | 5 | 5.3% | 13% | A |
| | 18 | 1.1 | 65% | — | 55 | 20 | 3.9% | 10% | A |
| | 19 | 1.1 | 55% | — | 50 | 10 | 9.8% | 24% | A |
| | 20 | 1.2 | 60% | — | 35 | 20 | 4.0% | 10% | A |
| | 21 | 1.2 | 63% | — | 37 | 15 | 9.3% | 23% | A |
| | 22 | 1.2 | 59% | — | 45 | 20 | 3.5% | 9% | A |
| | 23 | 1.2 | 63% | — | 37 | 15 | 6.1% | 15% | A |
| | 24 | 1.2 | 67% | — | 51 | 10 | 8.8% | 22% | A |

TABLE 1-continued

| Comp. | | | | | | | | |
|---|---|---|---|---|---|---|---|---|
| 1 | — | 49% | — | 53 | — | 23.0% | 65% | B |
| 2 | — | — | 41% | — | — | 17.6% | 49% | B |
| 3 | — | 53% | — | 36 | — | 19.2% | 48% | B |
| 4 | — | — | 40% | — | — | 15.1% | 38% | B |

(Evaluation)

In each of Examples 1 to 24, the magnetic substance in the cells was coated with the glass, so that the oxidation resistance was good.

On the other hand, in all of Comparative Examples 1 to 4, the magnetic substance in the cells was not coated with the glass, so that the oxidation resistance was poor.

DESCRIPTION OF REFERENCE NUMERALS 10, 20 honeycomb structure
2 metal pipe
3 control unit
4 coil wiring
5 fixing member
6 exhaust gas purifying device
11 outer peripheral wall
12, 22 partition wall
13, 14, 23, 24 end face
15, 25 cell (cell A+cell B)
16, 26 plugged portion
18, 28 magnetic substance
19, 29 glass

The invention claimed is:

1. A pillar shaped honeycomb structure, comprising:
an outer peripheral wall; and
porous partition walls disposed on an inner side of the outer peripheral wall, the partition walls defining a plurality of cells, each of the cells penetrating from one end face to other end face to form a flow path,
wherein at least one cell of the cells has a magnetic substance coated with glass,
the magnetic substance coated with the glass is provided in a form of a layer on surfaces of the partition walls in the cell to form a coating layer,
the coating layer has an open porosity of 40 to 90%,
the glass coating the magnetic substance has a thickness of 1 to 10 μm, and
a ratio of a thermal expansion coefficient α1 of the magnetic substance to a thermal expansion coefficient α2 of the glass: α1/α2 is 0.8 to 1.2.

2. The honeycomb structure according to claim 1, wherein the coating layer has a thickness of 30 to 100 μm.

3. The honeycomb structure according to claim 1, wherein the magnetic substance forms a magnetic substance portion made of a porous body.

4. The honeycomb structure according to claim 1, wherein the glass comprises SiO$_2$—MgO—Al$_2$O$_3$—ZnO.

5. The honeycomb structure according to claim 1, wherein the magnetic substance has a maximum magnetic permeability of 10,000 or more.

6. The honeycomb structure according to claim 1, wherein the magnetic substance comprises particles having a particle diameter of 30 μm or less.

7. The honeycomb structure according to claim 1, wherein a volume of the magnetic substance is 60 to 90% of a volume of the glass.

8. The honeycomb structure according to claim 1, wherein the magnetic substance has a Curie temperature of 600° C. or more.

9. The honeycomb structure according to claim 1, wherein the magnetic substance comprises a FeCo alloy containing 10% by mass or more of Co, or stainless steel.

10. The honeycomb structure according to claim 1, wherein the glass is substantially free of alkali metals.

11. The honeycomb structure according to claim 1, wherein the partition walls and the outer peripheral wall comprise a ceramic material.

12. The honeycomb structure according to claim 11, wherein the ceramic material is at least one selected from the group consisting of cordierite, silicon carbide, aluminum titanate, silicon nitride, mullite, and alumina.

13. The honeycomb structure according to claim 1, wherein the cells comprise:
a plurality of cells A which are opened on the one end face side and have plugged portions on the other end face; and
a plurality of cells B which are arranged alternately with the cells A, and which are opened on the other end face side and have plugged portions on the one end face.

14. An exhaust gas purifying device, comprising:
the honeycomb structure according to claim 1;
a coil wiring that spirally surrounds an outer circumference of the honeycomb structure; and
a metal pipe for housing the honeycomb structure and the coil wiring.

15. A pillar shaped honeycomb structure, comprising:
an outer peripheral wall; and
porous partition walls disposed on an inner side of the outer peripheral wall, the partition walls defining a plurality of cells, each of the cells penetrating from one end face to other end face to form a flow path,
wherein at least one cell of the cells has a magnetic substance coated with glass,
the magnetic substance coated with the glass is filled in the cell,
the glass coating the magnetic substance has a thickness of 1 to 10 μm, and
a ratio of a thermal expansion coefficient α1 of the magnetic substance to a thermal expansion coefficient α2 of the glass: α1/α2 is 0.8 to 1.2.

* * * * *